United States Patent [19]

Rasshofer et al.

[11] Patent Number: 4,855,504

[45] Date of Patent: Aug. 8, 1989

[54] PROCESS FOR PRODUCING HIGHER MOLECULAR WEIGHT AMINO COMPOUNDS HAVING REDUCED MONOMERIC AMINE CONTENT

[75] Inventors: Werner Rasshofer, Cologne; Ernst Grigat, Leverkusen; Gerhard Grögler, Leverkusen; Heinrich Hess, Leverkusen; Richard Kopp, Cologne, all of Fed. Rep. of Germany

[73] Assignee: Bayer Aktiengesellschaft, Bayerwerk, Fed. Rep. of Germany

[21] Appl. No.: 778,656

[22] Filed: Sep. 23, 1985

[30] Foreign Application Priority Data

Oct. 13, 1984 [DE] Fed. Rep. of Germany ....... 3437632

[51] Int. Cl.$^4$ ............................................. C07C 85/02
[52] U.S. Cl. ..................... 564/395; 564/437; 564/498; 564/504; 564/512; 560/19; 560/25; 560/44; 560/171

[58] Field of Search ............... 564/395, 437, 498, 504, 564/512; 560/44, 25, 19, 171

[56] References Cited

U.S. PATENT DOCUMENTS 3,625,871 12/1971 Traubel et al. .................. 521/63
4,331,778 5/1982 Sommerfeld et al. ............ 564/512

Primary Examiner—Robert V. Hines
Attorney, Agent, or Firm—Gene Harsh; Joseph C. Gil; Richard E. L. Henderson

[57] ABSTRACT

High molecular weight amines having reduced low molecular weight amine contents are obtained by reacting a mixture of (1) a high molecular weight amine and (2) a low molecular weight amine with (3) an isocyanate in quantities such that from 0.5 to 10 equivalents of isocyanate are present for each equivalent of low molecular weight amine. The product of high molecular weight amines is particualrly useful in the production of isocyanate addition products such as polyurethane plastics and foams.

11 Claims, No Drawings

PROCESS FOR PRODUCING HIGHER MOLECULAR WEIGHT AMINO COMPOUNDS HAVING REDUCED MONOMERIC AMINE CONTENT

BACKGROUND OF THE INVENTION

The present invention relates to a process for producing higher molecular weight amino compounds, in particular difunctional and/or higher functional amino compounds which are free from lower molecular weight amino compounds or have a greatly reduced lower molecular weight amino compound content. The present invention also relates to a process for the production of isocyanate addition products made with these modified higher molecular amino compounds.

Compounds containing higher molecular weight amino groups of the type obtained, for example, by hydrolysis of the corresponding NCO prepolymers to convert an NCO group into an $NH_2$ group are valuable starting materials for the production of poly(urea)urethanes as modifying epoxide cross-linking agents and for the known applications. These amino compounds are preferably obtained by alkaline hydrolysis of the NCO groups of prepolymers which are obtained by conversion of polyisocyanates (particularly of aromatic and/or also (cyclo)aliphatic diisocyanates such as toluylene diisocyanate, diphenylmethane diisocyanate and isophorone diisocyanate) with polyether polyols or polyester polyols containing two or tree hydroxyl groups (including polylactone ester diols or polycarbonate diols) in NCO/OH ratios >1, preferably from 1.8:1 to 2.5:1. NCO prepolymers of this type generally also contain certain proportions of monomeric, lower molecular weight polyisocyanates (for example, toluylene-2,4-diisocyanate diisocyanate (TDI)), which change into monomeric, lower molecular weight amines (for example, 2,4-toluylenediamine (TDA)) during the production of the higher molecular weight amino compounds (i.e. amino polyethers or amino polyesters). The quantity of monomeric lower molecular weight amino compounds present depends upon the quantity of free monomeric polyisocyanate in the precursor compound (e.g. in the NCO prepolymer) but may also depend upon the type of reaction control during production and the working up operation used.

It is possible to avoid lower molecular weight monomeric amines (for example, TDA) in the so-called amino polyethers or amino polyesters or to keep them to a minimum by keeping the content of monomeric, lower molecular weight isocyanate (for example, TDI) low in the corresponding NCO prepolymers. This can be done, for example, by using a NCO to OH ratio of greater than 2:1 (for example, from 5:1 to 20:1) when forming the prepolymer and then distilling off (e.g. by means of a so-called thin film evaporator) the excess monomeric (di)isocyanate. Monomeric concentrations of less than 0.5 wt % monomeric diisocyanate may thus be obtained. However, these methods have the disadvantage of the high cost for thin film distillation of suitable NCO prepolymers.

In another process, NCO/OH ratios of less than 2:1 (for example, from about 1.75 to 1.95) which means less starting diisocyanate is present than would be used for an "ideal" NCO prepolymer (NCO/OH ratio 2:1) are used during prepolymerization to obtain a product which is low in monomers (allowing for a certain pre-extension of the NCO prepolymer). This process has the disadvantage that the NCO prepolymer as well as the amine conversion product obtained from it have high viscosities which make them difficult to process.

However, it is worthwhile and desirable to remove monomeric amine, in particular aromatic diamines from the so-called higher molecular weight amino polyethers or amino polyesters. More specifically, removal of monomeric amines brings the higher molecular weight amines within the limits for the concentration of lower molecular weight (in particular aromatic) amines established by the government. Removal of monomeric amine also eliminates the negative influence of free aromatic, lower molecular weight amines on the stability to light of the amino polyethers or polyesters, or compositions produced therefrom. Such removal also makes it possible to avoid variations in properties in polyurethane ureas made with such polyamines attributable to monomer content. Further, removal of monomeric amine increases the stability to light and to discoloration in polyurethane plastics produced from the higher molecular weight amine.

SUMMARY OF THE INVENTION

It is an object of the present invention to provide a process for the production of higher molecular weight amine compounds having reduced lower molecular weight amino compound contents.

It is also an object of the present invention to provide a simple and economic process for producing higher molecular weight amine compounds which are substantially free from lower molecular weight amino compounds.

It is another object of the present invention to provide a process for the production of isocyanate addition products from higher molecular weight amine compounds which have less lower molecular weight amino compound present than known amines.

These and other objects which will be apparent to those skilled in the art are accomplished by reacting (a) a mixture of (1) an amino compound containing terminal aromatic and/or aliphatic amino groups and having a molecular weight of from 400 to 12,000 and (2) an amino compound having a molecular weight below 400 with (b) an isocyanate. The reactants are used in quantities such that from 0.5 to 10 equivalents of isocyanate (b) are present for each equivalent of amino compound (a)(2). The reaction product may then be reacted with a polyisocyanate, optionally in the presence of other isocyanate-reactive compounds having a molecular weight of from 400 to 12,000, chain extenders, cross-linking agents, blowing agents and/or catalysts to produce an isocyanate addition product.

DETAILED DESCRIPTION OF THE INVENTION

It has surprisingly been found that the content of lower molecular amines in high molecular weight amines can be reduced drastically if small quantities of isocyanate compounds, in particular aliphatic isocyanate compounds, are combined with a mixture of high and low molecular weight amino compounds.

The present invention relates to a process for producing higher molecular weight amino compounds, in particular di- and/or higher functional amino compounds (preferably with terminal aromatic groups) which are free from or have a greatly reduced content of lower molecular weight amino compounds. In this process, mixtures of (1) higher molecular weight amino compounds with terminal aromatic and/or aliphatic amino groups having molecular weights of from 400-12,000 (preferably from 600-6000) which are preferably di- and/or higher functional amino compounds with terminal aromatic primary amino groups, most preferably higher molecular weight amino polyethers or amino polyesters which have been obtained by alkaline hydrolysis of NCO polyether prepolymers or NCO polyester prepolymers and (2) small quantities of lower molecular weight amino compounds (as by-products or impurities) having molecular weights below 400, preferably aromatic amino compounds, most preferably (aromatic) diamines are reacted with mono-, di- and/or polyisocyanates, preferably (cyclo)aliphatic mono- and/or diisocyanates. These reactants are used in quantities such that for every equivalent of lower molecular weight amino compound from 0.5 to 10 equivalents (preferably from 0.8 to 5 and most preferably approximately equivalent quantities (from 0.95 to 1.1 equivalents)) of isocyanate is present.

The mixture of higher molecular weight amino compounds and lower molecular weight monomeric amino compounds is mixed with the isocyanate(s). The component which is used in the smaller quantity is generally added to the component used in a larger quantity, preferably while stirring. The isocyanate is therefore preferably added to the starting mixture of amines with stirring. The mixture may then be stirred for an additional period of from 1 minute to 24 hours. The isocyanate used can be dissolved in a NCO-inert solvent, but this is less preferable.

The process of the present invention is generally complete after the mixing operation and after a stirring or standing time of several hours. It is generally unnecessary to work up the mixture. However, if any solids have precipitated, the mixture may be filtered. It is preferred that the isocyanate(s) be selected to avoid precipitation of insoluble ureas within the higher molecular weight amino compounds.

The quantity of isocyanate added to the amine mixture is based on the quantity of the lower molecular weight amine to be collected. It should be noted that the quantity of isocyanate equivalents can be greater than the quantity of amine equivalents of the lower molecular weight amine, particularly where small and very small quantities of amine which are to be converted into urea compounds are used.

From 0.5 to 10 equivalents of NCO groups are generally used for each equivalent of lower molecular weight monomeric amine which is to be removed from the mixture to insure the complete, almost complete or at least predominant removal of the low molecular weight amine. From 0.8 to 5 and, in particular, approximately equivalent quantities (i.e. from about 0.95 to 1.1 equivalents) of NCO groups in the isocyanate(s) are preferably used for each equivalent of lower molecular weight amine. A smaller quantity of isocyanate may of course also be used if, for example, the amino monomeric content is to be reduced to a content below a certain limit value. If a larger than equivalent quantity of isocyanate is used, amino groups of the higher molecular weight amino compounds are reacted to a greater extent. Such larger quantities of isocyanate may be used, for example, where preextension of the higher molecular weight amine compounds is desirable.

The isocyanate(s) is also preferably selected and used in such quantities that the reaction mixture of amines and isocyanate(s) exhibits no precipitation but remains clear. However, insoluble urea products can be produced intentionally to achieve special effects.

The temperature at which the amine and isocyanate components are mixed is based on the viscosity of the component used in the larger quantity. In most cases, the appropriate temperature will be determined on the basis of the higher molecular weight amine component which is to be present in liquid (or dissolved) form. The temperature at which the components are combined should be as low as possible and should generally lie within the range of from $-20°$ to about $+80°$ C. With very high viscosity high molecular weight amines (for example, amino polyesters which may even occur in partially crystalline form), the upper temperature range may even be exceeded, for example the mixture may be heated to about 120° C. for a short period.

It has surprisingly been found that the isocyanate added is capable of reacting extensively and almost exclusively (in the preferred embodiments) with the lower molecular weight amino compounds. Therefore, it is now possible to produce amino polyethers or other higher molecular weight polyamino compounds which do not contain significant proportions of monomeric amine by processes for the monomer reduction of pretreated NCO prepolymers which are not disclosed in the prior art. After reducing the content of free (di)amines, in particular aromatic (di)amines, the corresponding higher molecular weight polyamines can be used widely and to advantage. Moreover, it has surprisingly been found that higher molecular weight amino compounds produced by methods other than the saponification of NCO prepolymers, which amino compounds contain monomeric lower molecular weight amines, can be freed from their monomeric amine content by the process of the present invention.

The amine mixture is generally composed of from 90 to 99.95 parts by weight of higher molecular weight amine and from 10 to 0.05 parts by weight of low molecular weight amine, preferably from 95 to 99.9 parts by weight of high molecular weight amine and from 5 to 0.1 parts by weight of low molecular weight amine, most preferably from 97 to 99.7 parts by weight of high molecular weight amine and from 3 to 0.3 parts by weight of low molecular weight amine.

In principle, suitable isocyanates for the process of the present invention include all organic isocyanates containing at least one NCO group, i.e. mono-, di- and optionally higher functional, aromatic and/or aliphatic isocyanates, whether in monomeric form or in one of the many known lower and/or higher molecular weight modifications (for example, in the form of NCO prepolymers with urethane groups) known to the skilled artisan.

Thus, for example, organic polyisocyanates corresponding to the formula $R(NCO)_n$, in which R represents polyvalent, optionally urethane-, biuret- and/or isocyanurate group-containing aliphatic or cycloaliphatic radicals or mixed radicals of this type and n represents an integer whose value corresponds to the valency of R and is at least 2, preferably from 2 to 3, may be used. Particular examples of such polyisocyanates include aliphatic diisocyanates such as ethylene diisocyanate, propylene-1,2-diisocyanate, butylene-1,4-diisocyanate, 2,2,4-trimethylhexamethylene-1,6-diisocyanate and preferably hexamethylene-1,6-diisocyanate; cycloaliphatic diisocyanates, such as cyclohexane-1,2-, -1,3- and/or -1,4-diisocyanate, 1-methylcyclohexane-2,4- and/or -2,6-diisocyanate as well as the corresponding isomer mixtures, 4,4'-, 2,4'- and 2,2'-dicyclohexylmethane-diisocyanate and the corresponding isomer mixtures and preferably 3-isocyanatomethyl-3,5,5-trimethylcyclohexylisocyanate (isophoronediisocyanate); and polyisocyanates, such as polycyclohexyl-polymethylene polyisocyanates containing from 2 to 6, preferably 3 cyclohexylene radicals in the molecule. α,α'-dimethyl-p-xylylene-diisocyanate; α,α-,α',α'-tetramethyl-m-xylylene-diisocyanate; α,α,α,α'-tetramethyl-p-xylylenediisocyanate; α-methyl-α,α'-dimethyl-m-xylylene-diisocyanate; bis-[4-(1-isocyanato-1-methyl-ethyl)phenyl]methane: α-ethyl-α'-methyl-p-xylylene-diisocyanate: 2,6-bis-(1-isocyanato-1-methylethyl)naphthalene; 1,4-bis-(1-isocyanato-1-methylethyl)cyclohexane; 1,3-bis-(1-isocyanato-1-methylethyl)cyclohexane; 1,8-diisocyanato-p-methane; and 3- or 4-, 8- or 9-bis-(isocyanatomethyl)-tricyclo-[5,2,1,0]decane-isomers are also suitable.

Isocyanurate-, biuret- and, in particular, urethane group-containing polyisocyanates and mixtures thereof, produced from aliphatic or cycloaliphatic diisocyanates, are also suitable. The production of isocyanurate group-containing polyisocyanates which preferably have NCO contents of from 15 to 30 wt % is described, for example, in German Patentschriften Nos. 1,022,789, 1,222,067 and 1,027,394 and in German Offenlegungsschriften Nos. 1,929,034 and 2,004,048. Biuret group-containing polyisocyanates having NCO contents of from 30 to 15 wt %, preferably of from 25 to 20 wt % and viscosities of from 6000 to 500 (preferably from 4000 to 1000) mPas at 20° C. are described, for example, in German Patentschrift No. 1,101,394 and German Offenlegungsschrift No. 2,261,065. Urethane group-containing polyisocyanates can be obtained, for example by reaction of the above-mentioned aliphatic or cycloaliphatic diisocyanates, (preferably by reaction of hexamethylene diisocyanate and isophorone diisocyanate) with optionally substituted or modified alkane diols containing from 2 to 10 (preferably from 2 to 6) carbon atoms in the alkylene radical (such as ethylene glycol, butane-1,4-diol, dipropylene glycol, hexane-1,6-diol and neopentyl glycol, hydroxypivalic acid neopentyl glycol or mixtures thereof) in a molar ratio of approximately 2:1.

Aliphatic isocyanates or NCO group-containing derivatives of these aliphatic mono-, di- and/or polyisocyanates are preferred for the process of the present invention. Unmodified aliphatic (including cycloaliphatic) monoisocyanates which exist in pure form and the (cyclo)aliphatic diisocyanates are preferred. (Cyclo)aliphatic mono- and diisocyanates in which the NCO groups are at secondary or tertiary atoms are particularly preferred.

Preferred isocyanates include monoisocyanates such as n-propylisocyanate, n-butylisocyanate, isobutylisocyanate, n-hexylisocyanate, 6-chloro-hexylisocyanate, 2-ethylhexylisocyanate, dodecylisocyanate, tetradecylisocyanate, stearylisocyanate, cetylisocyanate and allylisocyanate. Isopropylisocyanate, sec.-butylisocyanate, tert.-butylisocyanate, tert.-pentylisocyanate and diisocyanates such as hexane diisocyanate and isophorone diisocyanate are particularly preferred. Polyisocyanates containing more than two NCO groups are less preferred alone as they usually increase the viscosity of the higher molecular weight polyamines more markedly. Therefore, polyisocyanates are preferably used only in addition to mono- and diisocyanates.

The mixtures of higher molecular weight amino compounds which contain lower molecular weight amino compounds as a result of the method of production thereof can be produced by a plurality of processes.

German Auslegeschrift No. 1,270,046 describes a process for producing defined primary aromatic amines containing polyalkylene glycol ether segments. More specifically, aromatic di- or triisocyanates are reacted with reaction products of polyalkylene glycol ethers and/or polyalkylene glycol thioethers (preferably those having molecular weights between 400 and 4000) with secondary or tertiary carbinols. These reaction products are then subjected to thermal fission at high temperatures in an inert solvent (optionally in the presence of acidic catalysts). In this process, any di- or triisocyanates still present are converted via carbinol adducts into the corresponding free amines.

German Auslegeschrift No. 1,694,152 discloses production of prepolymers containing at least two terminal amino groups by reacting excess quantities of hydrazine, aminophenylethylamine or other diamines with an NCO prepolymer formed from a polyether polyol and polyisocyanate (NCO:OH ratio =1.5:1 to 1:5). Any unreacted amine must be removed carefully in a further step because it strongly catalyzes the reaction with polyisocyanates, leading to short processing times and may act as a reactant itself.

Another method for synthesizing polyamines containing urethane groups is described in French Patent No. 1,415,317. Urethane group-containing NCO prepolymers are converted with formic acid into the Nformyl derivatives which are saponified to form terminal aromatic amines. The reaction of NCO prepolymers with sulfamic acid according to German Auslegeschrift No. 1,155,907 also leads to compounds with terminal amino groups. In both of these processes, monomeric polyisocyanates present in the NCO prepolymers are converted into the corresponding amines.

Moreover, preadducts containing higher molecular weight aliphatic, secondary and primary amino groups according to German Auslegeschrift No.1,215,373 are obtained by reacting higher molecular weight hydroxyl compounds with ammonia in the presence of catalysts under pressure at elevated temperatures. Such preadducts are also obtainable according to U.S. Pat. No. 3,044,989 or German Auslegeschrift No. 1,193,671 by reacting higher molecular weight polyhydroxyl compounds with acrylonitrile with subsequent catalytic hydration. Polyoxyalkylene polyamines are also obtainable according to U.S. Pat. No. 3,236,895 by amination using ammonia via sulfonic acid esters of polypropylene glycol. The reaction of a polyalkylene glycol with epichlorohydrin and subsequent reaction with an excess of a primary amine according to French Patent No. 1,466,708 to form products containing secondary amino groups is also known. German Offenlegungsschrift No. 2,546,536 and U.S. Pat. No. 3,865,791 teach that compounds containing higher molecular weight terminal amino groups and urethane groups may be obtained by reacting NCO prepolymers with enamines, aldimines or ketimines containing hydroxyl groups and subsequent hydrolysis. Another method for synthesizing aromatic polyamines containing urethane groups and ether groups involves the ring opening which occurs during the reaction of isatoic acid anhydride and diols. Such polyamines are described, for example, in U.S. Pat. No.

4,180,644 and German Offenlegungsschriften No. 2,019,432, 2,619,840, 2,648,774 and 2,648,825.

The reaction of nitroarylisocyanates with polyols and subsequent reduction of the nitro groups to form aromatic amine groups is another possible method of producing the amine mixtures (U.S. Pat. No. 2,888,439) useful in the present invention. Polyamines can also be produced by reacting benzylalcohol with NCO prepolymers to form benzylurethanes which are subsequently converted to amines (German Offenlegungsschrift No. 3,035,639). These two processes have a great disadvantage in the high costs of the reduction stage to be carried out under pressure.

Without describing each of the above-described methods for the production of amino compounds in detail, it is obvious that removal of free monomeric amine from the amines produced by any of these methods would be desirable.

Mixtures of the types obtained by the hydrolysis processes disclosed in German Offenlegungsschriften Nos. 2,948,419, 3,039,600, 3,112,118, 3,131,252, 3,200,021, 3,144,991, 3,144,874, 3,223,395 and 3,223,400 by alkaline hydrolysis (for example, using potassium hydroxide solution) of NCO prepolymers (from substantially higher molecular weight polyhydroxyl compounds and excess polyisocyanates) and working up as higher molecular weight polyamines (mixtures) are preferably used as the amine components in the present invention.

Suitable starting materials such as higher molecular weight polyether polyols, polyester polyols, polycarbonate polyols, lower molecular weight polyols which can optionally also be used and polyisocyanates as well as processes for conversion into polyamines are described in detail in the above-listed disclosures and can also be used as mixtures of polyamino compounds in the present invention.

Hydrolysis products of NCO prepolymers from higher molecular weight polyether polyols (preferably polyether polyols based on propylene oxide and/or ethylene oxide) and aromatic diisocyanates (in particular, toluylene-2,4-diisocyanate) are particularly preferred. It is preferred to employ the higher molecular weight amines formed by thermal decomposition of carbamates disclosed in German Offenlegungsschrift No. 3,132,252.

The lower molecular weight amino compounds can be, for example, the diamines and/or polyamines which are produced by hydrolysis from the di- and/or polyisocyanates present as free monomeric di- or polyisocyanates during NCO prepolymer formation. However, the low molecular weight amine compounds may also be produced during the production of the higher molecular weight amino compounds or as precursor compounds (intermediate products) during production. For example, radicals of unreacted nitroanilines or paraphenylene diamines produced therefrom by reduction may be present during the reaction of NCO prepolymers with nitroanilines and subsequent reduction. Similarly, other amine starting materials or lower molecular weight amino compounds which are formed as by-products during the production of the higher molecular weight amine or are formed during storage may be present in the amine mixture subjected to the reaction with the isocyanate(s) to reduce or remove those amines from the higher molecular weight amine or at least to lower their content drastically below an undesirable level.

The urea compounds which may be formed during the process of the present invention (for example, when using monoisocyanates) include the mono or bis ureas of diamines or the urea of nitroanilines. When diisocyanates are used in the process of the present invention, corresponding mono or bis ureas can be formed with monoamines, and oligomeric or polymeric ureas can be formed with diamines (which can optionally be bonded in minor quantities with the higher molecular weight amines). The urea compounds formed are generally no more volatile.

It was surprising that the lower molecular weight amino compounds preferably react with the isocyanates before the higher molecular weight amino compounds which are present in a considerably greater quantity in the mixture. Higher molecular weight amino compounds which are freed from undesirable quantities of lower molecular weight amines possess advantageous properties and can advantageously be reacted to form high molecular weight polyurethanes are thus produced.

For the modification reaction of the present invention, the content of lower molecular weight amino compounds is advantageously determined beforehand by analysis so that suitable quantities of isocyanates may be used.

The higher molecular weight polyamino compounds or polyamino compound mixtures which are freed from or reduced in their lower molecular weight accompanying amines obtained by the process of the present invention are generally colorless to slightly colored, viscous or optionally relatively low melting (preferably melting below 60° C) products. After reduction of the lower molecular weight amine content, the amines are substantially odorless and are physiologically harmless for use in polyisocyanate polyaddition processes for the production of polyurethane plastics.

The amine content of the higher molecular weight amines modified according to the present invention generally lies between 0.2 and 12 wt %, preferably between 0.3 and 10 wt % and most preferably 0.5 and 6 wt %.

The present invention also relates to the use of the higher molecular weight polyamines which are freed from or considerably reduced in their content of lower molecular weight amino compounds obtained by the process of the present invention (preferably possessing aromatic amino groups) for the production of optionally cellular isocyanate addition products such as polyurethane plastics or PU foams by known processes. More specifically, the polyamines produced by the process of the present invention and optionally other higher molecular weight di- and/or polyfunctional compounds containing hydrogen groups which are reactive towards NCO and with molecular weights of from 400 to 12,000 (preferably from 600 to 6000), optionally lower molecular weight chain extenders and/or cross-linking agents having molecular weights of 18, 32 and/or 60 to 399 are reacted with di- and polyisocyanates, optionally with addition of conventional auxiliaries and additives.

Suitable starting components for the production of isocyanate addition products such as polyurethane plastics are mentioned above in connection with the production of the prepolymers and also in German Auslegeschriften Nos. 2,302,564, 2,432,764 (U.S. Pat. No. 3,903,679), 2,639,083, 2,512,385, 2,513,815, 2,550,796, 2,550,797, 2,550,833, 2,550,860 and 2,550,862. These disclosures also teach auxiliaries and additives which can optionally also be used in the production of polyurethanes.

A further, preferred application of the polyamines modified according to the present invention lies in their use as reactive components in single component reactive systems containing solid diisocyanates or diisocyanates of retarded reactivity as disclosed in German Offenlegungsschriften Nos. 3,230,757, 3,403,500, 3,403,499, 3,403,497, 3,418,430 and European Patent Application No. 62,780.

Further applications for the polyamines produced according to the present invention include use as coupling components for diazo dyes, hardeners for epoxide and phenol resins, and in other known reactions of amines such as amide or imide formation.

The invention is further illustrated, but is not intended to be limited by the following examples in which all parts and percentages are by weight unless otherwise specified.

EXAMPLES

Experiments 1-23

Production of the higher molecular weight aromatic amino polyethers (Process disclosed in German Offenlegungsschrift No. 3,131,252)

1 mol of a linear polypropylene ether glycol having an OH number of 56 and 2 mol of toluylene-2,4diisocyanate were converted into an NCO prepolymer (3.58% of NCO) by heating for 4 hours at 80° C. 810 g of the 45° C hot NCO prepolymer were added to a cooled solution of 52.2 g of potassium hydroxide, 500 ml of water and 300 ml of acetone with intensive stirring (NCO:-ratio$\theta$ ratio=1:1.35), in such a way that an internal temperature of 25° C. was not exceeded. The mixture was stirred at this temperature for an additional 30 mins and then heated to reflux for 2 hours. After standing for 30 mins, the lower aqueous salt solution was separated from the two-phase reaction mixture and rejected. The upper phase was freed from any remaining water and acetone at 20 mbar/80° C. and then at 1 mbar/100° C. Slight residues of salt were separated and the polyether amine was isolated by suction filtering the 60° C. hot product over a pressure suction filter (3 bar excess pressure). This procedure was repeated three times. The polyether amine charges I, II and III obtained had the conventional variation in properties (NH number or content of free 2,4-toluylene diamine (TDA)).

100 g of amino polyether were stirred with increasing quantities of isocyanate at 25° C. and allowed to stand for 24 hours. Isopropylisocyanate was used in the Examples reported in the Tables 1 and 2 and hexamethylene diisocyanate was used in the Examples reported in the Table 3. NH numbers (perchloric acid/glacial acetic acid-titration), viscosities and contents of monomeric toluylene-2,4-diamine (TDA) of all of the samples were then determined by high pressure liquid chromatography (HPLC) and compared with the corresponding data for amino polyethers which had not been modified in accordance with the present invention.

The results are given in Tables 1, 2 and 3.

The evaluations of the data compiled in Tables and 3 are listed in Tables 4 to 6.

The object of each of these experiments was to allow the NCO groups of the added aliphatic isocyanates to react with the amino groups of the monomeric polyamine (TDA) and not with the amino groups of the amino polyether. For the sake of simplicity, it was assumed that the amino polyether contained substantially exclusively amino groups which corresponded to the 2-position of the $NH_2$ group in the 2,4-toluylene diamine (from 2,4-toluylene diisocyanate), and that, under the reaction conditions, the 4-amino group of the 2,4-TDA preferably reacts with the isocyanate groups from n-propylisocyanate or of the hexamethylene diisocyanate.

In Tables 1 and 4, the measured starting NH-number, that is the measured NH-number of the amino polyether charge used was 49.15 (mg KOH/g). The NH-number of TDA (11 (mg KOH/g) in this case) which was to be deducted from the total NH-number found can be calculated via the content of free monomeric TDA-100 determined by HPLC (1.464 wt % in this case, see Table 4). The proportion of the NH-number pertaining to the amino polyether (i.e. high molecular weight amine) is thus obtained (38.15 (mg KOH/g) in this case). If the quantities of i-polyisocyanate listed in Table 1 (0, 0.3, 0.7, 1.4, 2.8, 5.6 or 11.2 g) are added and it is assumed that each NCO group collects an amino group, the NH-numbers determined by calculation and listed in the row of Table 4 listed as NH-number after addition of isocyanate are obtained and are compared with the NH-numbers actually found in the following row. The proportion of TDA and of amino polyether in the NH-numbers found, which is indicated in absolute numbers and in percentages in the last four rows of Table 4 can be determined via the 2,4-TDA contents determined after addition of isocyanate (from Table 1). It can now be seen from Table 4 that up until experiment 4 the proportion of amino polyether in the NH-number remained substantially constant, that the percentage of amino polyether amino groups in the total NH-number increased and that the isopropyl isocyanate reacted substantially selectively with the monomeric diamines and not with the amino polyether. If the viscosity obtained is included in these considerations, the addition of about 1 g of i-propylisocyanate appears to produce the optional results, that is: the total NH-number is reduced by about 13%; the quantity of free TDA is reduced by about 70%; the viscosity (25° C.) is increased by about 60%; and substantially no reduction of functionality in the amino polyether occurs.

In the experiments reported in Tables 2 and 5, 3 and 6, similar behavior was observed.

TABLE 1

| | Reaction of aminopolyether I (NH number = 49.15) with isopropylisocyanate as aliphatic isocyanate | | | | | | |
|---|---|---|---|---|---|---|---|
| Experiment No. | 1 | 2 | 3 | 4 | 5 | 6 | 7 |
| NH-number of mixture (mg KOH/g) (measured) | 49.15 | 48.4 | 43.5 | 41.3 | 32.2 | 13.64 | 4.12 |
| quantity of aliphatic isocyanate added (gm) | — | 0.3 | 0.7 | 1.4 | 2.8 | 5.6 | 11.2 |
| quantity of isocyanate groups (gm) | — | 0.148 | 0.345 | 0.691 | 1.383 | 2.767 | 5.534 |

TABLE 1-continued

Reaction of aminopolyether I (NH number = 49.15) with isopropylisocyanate as aliphatic isocyanate

| Experiment No. | 1 | 2 | 3 | 4 | 5 | 6 | 7 |
|---|---|---|---|---|---|---|---|
| mols aliphatic isocyanate added | — | 0.00353 | 0.0085 | 0.0165 | 0.033 | 0.0659 | 0.13 |
| Difference in mols of aliphatic isocyanate** | — | 0.00353 | 0.0047 | 0.008 | 0.0165 | 0.0329 | 0.0641 |
| Total mols aliphatic isocyanate added | — | 0.00353 | 0.01203 | 0.02853 | 0.06153 | 0.012743 | 0.25743 |
| TDA Content* (wt %) (measured) | 1.464 | 1.134 | 0.509 | 0.395 | 0.058 | 0 | 0 |
| Mols TDA present (calculated) | 0.012 | 0.0093 | 0.0042 | 0.0032 | 0.00047 | 0 | 0 |
| Mols TDA*** | — | 0.0027 | 0.0051 | 0.00096 | 0.00272 | — | — |
| Total mols TDA removed | — | 0.0027 | 0.0078 | 0.00876 | 0.01148 | 0.01148 | 0.01148 |
| Viscosity (mPa · s at 25° C.) | 12,500 | 15,000 | 16,500 | 22,000 | 33,000 | 91,000 | 110,000 |

*determined by high pressure, liquid chromatography (HPLC)
**Difference calculated by subtracting mols of aliphatic isocyanate added from mols of aliphatic isocyanate present in preceding experiment.
***Calculated by subtracting mols of TDA present from mols TDA present in preceding experiment.

TABLE 2

Reaction of aminopolyether II (NH number = 47.28) with isopropylisocyanate as aliphatic isocyanate

| Experiment No. | 8 | 9 | 10 | 11 | 12 | 13 | 14 | 15 |
|---|---|---|---|---|---|---|---|---|
| NH-number of mixture (mg KOH/g) (measured) | 47.28 | 45.9 | 44.28 | 43.7 | 41.9 | 37.6 | 20.5 | 2.89 |
| quantity of aliphatic isocyanate added (gm) | — | 0.2 | 0.4 | 0.8 | 1.2 | 2.0 | 5.0 | 10.0 |
| quantity of isocyanate groups (gm) | — | 0.098 | 0.196 | 0.392 | 0.588 | 0.98 | 2.45 | 4.9 |
| mols aliphatic isocyanate added | — | 0.00235 | 0.00471 | 0.00941 | 0.01411 | 0.02353 | 0.05882 | 0.11765 |
| Difference in mols of aliphatic isocyanate** | — | 0.00235 | 0.00235 | 0.00471 | 0.00471 | 0.00941 | 0.03529 | 0.05882 |
| Total mols aliphatic isocyanate | — | 0.00235 | 0.00706 | 0.01647 | 0.03058 | 0.05411 | 0.11293 | 0.23058 |
| Total mols isocyanate groups | — | 0.00115 | 0.00346 | 0.00807 | 0.01498 | 0.02651 | 0.05533 | 0.11298 |
| TDA Content* (wt %) (measured) | 0.583 | 0.511 | 0.444 | 0.306 | 0.192 | 0.073 | — | — |
| Mols TDA present (calculated) | 0.004779 | 0.004188 | 0.003639 | 0.002508 | 0.001573 | 0.000598 | — | — |
| Mols TDA*** | — | 0.000591 | 0.000549 | 0.001131 | 0.000935 | 0.000975 | — | — |
| Total mols TDA removed | — | 0.000591 | 0.00114 | 0.002271 | 0.003206 | 0.004181 | — | — |
| Viscosity (mPa · s at 25° C.) | 17,000 | 17,000 | 17,000 | 17,500 | 19,000 | 21,000 | 53,000 | 250,000 |

*determined by (HPLC)
**Difference calculated by subtracting mols of aliphatic isocyanate added from mols of aliphatic isocyanate present in preceding experiment.
***Calculated by subtracting mols of TDA present from mols TDA present in preceding experiment.

TABLE 3

Reaction of aminopolyether III (NH number = 48.75) with hexamethylene diisocyanate (HDI) as aliphatic isocyanate.

| Experiment No. | 16 | 17 | 18 | 19 | 20 | 21 | 22 | 23 |
|---|---|---|---|---|---|---|---|---|
| NH-number of mixture (mg KOH/g) (measured) | 48.75 | 48.32 | 47.61 | 46.89 | 45.73 | 44.52 | 34.32 | 20 |
| quantity aliphatic isocyanate added (gm) | — | 0.1 | 0.2 | 0.4 | 0.6 | 1 | 2.5 | 5 |
| quantity isocyanate groups (gm) | — | 0.05 | 0.1 | 0.2 | 0.3 | 0.5 | 1.25 | 2.5 |
| mols ($10^{-3}$) aliphatic isocyanate | — | 0.5952 | 1.1905 | 2.3809 | 3.5713 | 5.9523 | 14.8807 | 29.7615 |

TABLE 3-continued

Reaction of aminopolyether III (NH number = 48.75) with hexamethylene diisocyanate (HDI) as aliphatic isocyanate.

| Experiment No. | 16 | 17 | 18 | 19 | 20 | 21 | 22 | 23 |
|---|---|---|---|---|---|---|---|---|
| added | | | | | | | | |
| Difference in mols ($10^{-3}$) of aliphatic isocyanate** | — | 0.5952 | 0.5952 | 1.1905 | 1.1905 | 2.3809 | 8.9284 | 14.8807 |
| Total mols aliphatic isocyanate ($10^{-3}$) | — | 0.5952 | 1.7857 | 4.1666 | 7.7379 | 13.6902 | 28.5709 | 58.3324 |
| TDA Content* (wt %) (measured) | 0.819 | 0.785<br>0.750[1] | 0.727<br>0.712[1] | 0.695<br>0.644[1] | 0.532<br>0.553[1] | 0.367<br>0.376[1] | 0.074<br>0.093[1] | —<br>0.025[1] |
| Mols TDA present (calculated) ($10^{-2}$) | 0.6713 | 0.6434<br>0.61475[1] | 0.5959<br>0.5836[1] | 0.5697<br>0.5278[1] | 0.4361<br>0.4533[1] | 0.3008<br>0.3082[1] | 0.0607<br>0.0762[1] | —<br>0.0205[1] |
| Mols TDA ($10^{-2}$)*** | | 0.0279<br>0.0565[1] | 0.0475<br>0.0312[1] | 0.0262<br>0.0558[1] | 0.1336<br>0.0745[1] | 0.1353<br>0.745[1] | 0.2401<br>0.2320[1] | —<br>0.0557[1] |
| Total mols TDA removed ($10^{-2}$) | — | 0.0279<br>0.0665[1] | 0.0754<br>0.0877[1] | 0.1016<br>0.1435[1] | 0.2352<br>0.2180[1] | 0.3705<br>0.3631[1] | 0.6106<br>0.5951[1] | 0.6106<br>0.6508[1] |
| Viscosity (mPa · s at 25° C.) | 15,000 | 15,000<br>17,500[1] | 16,000<br>19,000[1] | 16,000<br>22,300[1] | 20,000<br>28,000[1] | 23,000<br>45,000[1] | 110,000<br>145,000[1] | — |

*determined by HPLC
**Difference calculated by subtracting moles of aliphatic isocyanate added from mols of aliphatic isocyanate present in preceding experiment.
[1]Values measured or determined from values measured after a standing time of 1 week.
***Calculated by subtracting mols of TDA present from mols TDA present in preceding experiment.

TABLE 4

Evaluation of Experiments 1–7

| Experiment No. | 1 | 2 | 3 | 4 | 5 | 6 | 7 |
|---|---|---|---|---|---|---|---|
| Starting NH-number (mg KOH/g) | 49.15 | 49.15 | 49.15 | 49.15 | 49.15 | 49.15 | 49.15 |
| NH-number by TDA (calc.) (mg KOH/g) | 11 | 11 | 11 | 11 | 11 | 11 | 11 |
| NH-number (calc.) after deducting the TDA-content (mg KOH/g) | 38.15 | 38.15 | 38.15 | 38.15 | 38.15 | 38.15 | 38.15 |
| NH-number (calc.) after addition of isocyanate with complete reaction | (49.15) | 48.17 | 45.84 | 41.32 | 32.27 | 14.18 | — |
| found NH-number (mg KOH/g) | (49.15) | 48.4 | 43.5 | 41.3 | 32.2 | 13.64 | 11.2 |
| proportion of polyether amine in the found NH-number (mg KOH/g) | 38.15 | 39.9 | 39.7 | 38.3 | 31.8 | 13.6 | 11.2 |
| proportion of polyether amine in the found NH-number in % | 77.6 | 82.4 | 91.2 | 92.8 | 98.7 | 100 | 100 |
| proportion of TDA in the found NH-number (mg KOH/g) | 11 | 8.5 | 3.8 | 3.0 | 0.44 | — | — |
| proportion of TDA in the found NH-number in % | 22.4 | 17.6 | 8.8 | 7.2 | 1.30 | — | — |

TABLE 5

Evaluation of Experiments 8–15

| Experiment No. | 8 | 9 | 10 | 11 | 12 | 13 | 14 | 15 |
|---|---|---|---|---|---|---|---|---|
| Starting NH-number (mg KOH/g) | 47.28 | 47.28 | 47.28 | 47.28 | 47.28 | 47.28 | 47.28 | 47.28 |
| NH-number by TDA (calc.) (mg KOH/g) | 4.4 | 4.4 | 4.4 | 4.4 | 4.4 | 4.4 | 4.4 | 4.4 |
| NH-number (calc.) after deducting the TDA-content (mg KOH/g) | 42.88 | 42.88 | 42.88 | 42.88 | 42.88 | 42.88 | 42.88 | 42.88 |
| NH-number (calc.) after addition of isocyanate with complete reaction | 47.28 | 46.63 | 45.34 | 42.76 | 38.89 | 32.43 | 16.29 | — |
| found NH-number (mg KOH/g) | 47.28 | 45.9 | 44.28 | 43.7 | 41.9 | 37.6 | 20.5 | 2.89 |
| proportion of polyether amine in the found NH-number (mg KOH/g) | 42.88 | 42.1 | 40.94 | 41.4 | 40.46 | 37.05 | 20.5 | 2.89 |
| proportion of polyether amine in the found NH-number in % | 90.7 | 91.6 | 92.5 | 94.7 | 96.6 | 98.5 | 100 | 100 |
| proportion of TDA in the found NH-number (mg KOH/g) | 4.4 | 3.8 | 3.34 | 2.30 | 1.44 | 0.55 | — | — |
| proportion of TDA in the found NH-number in % | 9.3 | 8.4 | 7.5 | 5.3 | 3.4 | 1.5 | — | — |

TABLE 6

Evaluation of Experiments 16–23

| Experiment No. | 16 | 17 | 18 | 19 | 20 | 21 | 22 | 23 |
|---|---|---|---|---|---|---|---|---|
| Starting NH-number (mg KOH/g) | 48.75 | 48.75 | 48.75 | 48.75 | 48.75 | 48.75 | 48.75 | 48.75 |
| NH-number by TDA (calc.) (mg KOH/g) | 7.5 | 7.5 | 7.5 | 7.5 | 7.5 | 7.5 | 7.5 | 7.5 |
| NH-number (calc.) after deducting | 41.25 | 41.25 | 41.25 | 41.25 | 41.25 | 41.25 | 41.25 | 41.25 |

TABLE 6-continued

| | Evaluation of Experiments 16-23 | | | | | | | |
|---|---|---|---|---|---|---|---|---|
| Experiment No. | 16 | 17 | 18 | 19 | 20 | 21 | 22 | 23 |
| the TDA-content (mg KOH/g) | | | | | | | | |
| NH-number (calc.) after addition of isocyanate with complete reaction | 48.75 | 48.58 | 48.25 | 47.58 | 46.58 | 44.91 | 40.75 | 32.41 |
| found NH-number (mg KOH/g) | 48.75 | 48.32 | 47.61 | 46.89 | 45.73 | 44.52 | 34.32 | 20 |
| proportion of polyether amine in the found NH-number (mg KOH/g) | 41.25 | 41.11 | 40.94 | 40.51 | 40.85 | 41.15 | 33.64 | — |
| | | 41.44 | 41.08 | 40.98 | 40.66 | 41.07 | 33.47 | 20 |
| proportion of polyether amine in the found NH-number in % | 84.6 | 85.1 | 86.0 | 86.4 | 89.3 | 92.4 | 98.0 | — |
| | | 85.8 | 86.3 | 87.4 | 88.9 | 92.3 | 97.5 | 100 |
| proportion of TDA in the found NH-number (mg KOH/g) | 7.5 | 7.21 | 6.67 | 6.38 | 4.88 | 3.37 | 0.68 | — |
| | | 6.88 | 6.53 | 5.91 | 5.07 | 3.45 | 0.85 | 0.23 |
| proportion of TDA in the found NH-number in % | 15.4 | 14.9 | 14.0 | 13.6 | 10.7 | 7.6 | 2.0 | — |
| | | 14.2 | 13.7 | 12.6 | 11.1 | 7.7 | 2.5 | — |

Experiment 2

1.75 g of n-propylisocyanate were added dropwise to 438.4 g of amino polyether having an NH-number of 80.4, a viscosity of 127 Pas (25° C.) and a TDA content of 0.148% at 23° C. with stirring. The product modified in this way had a TDA content of 0.093% and an NH-number of 77.4.

The amino polyether employed in the above-described procedure was produced as follows: 1 mol of a linear polypropylene ether glycol having an OH number of 112 and 2 mol of toluylene-2,4-diisocyanate were converted into a NCO prepolymer (6.01% of NCO) by heating for 4 hours to 80° C. The 45° C. hot NCO product was added to a cooled solution of 162.4 g of potassium hydroxide and 800 ml of water (NCO:OH$^\ominus$ ratio =1:1.45) with intensive stirring in such a wa that an internal temperature of 25° C. was not exceeded. The mixture was stirred for a further 30 mins at this temperature and then heated for 2 hours to reflux. After standing for 30 mins, the lower aqueous salt solution was separated from the two-phase reaction mixture and rejected. The upper phase was freed from residual water at 20 mbar/80° C. and then at 1 mbar/100° C. Slight residues of salt were separated and the polyether-amine (NH-number 80.4) was isolated by suction filtering the 60° hot product over a pressure suction filter (3 bar excess pressure).

Experiment 25

Production of an amino polyether modified according to the invention.

100 parts by weight of an aromatic amino polyether based on a polyoxypropylene ether diol (molecular weight 2000) and toluene-2,4-diisocyanate (molar ratio 1:2) (produced by the process described in German Offenlegungsschrift No. 2,948,419), having an amine number of 48.8 mg KOH/g were stirred with (a) 0.97 and (b) 1.94 parts by weight respectively of 3-isocyanatomethyl-3,5,5-trimethylcyclohexylisocyanate (IPDI) at room temperature, heated for 2 hours at 90° C. and subsequently degassed. The amino polyethers obtained in each case had a high viscosity and a low free TDA content (determined by HPLC). The characteristic data for each of these amino polyethers are given in Table 7.

Application (a) 0.1 parts of 3,3'-dimethyl-4,4'-diaminodicyclohexylmethane were dissolved in amino polyether 25(a) (modified according to the invention) with 0.97 parts of IPDI and 15.46 parts of finely divided dimeric 2,4-diisocyanatotoluene (TT) were suspended therein. After pouring the mixture into a metallic mold provided with a silicone release agent, thoroughly heating the mold for 16 hours and then heat treating the mold at 120° C, an elastomer having the mechanical properties specified in Table 7 was obtained.

(b) 0.15 parts of 3,3'-dimethyl-4,4'-diaminodicyclohexylmethane were dissolved in the amino polyether 25(b) modified with 1.94 parts of IPDI and 15.15 parts of 4,4'-dimethyl-3,3'-diisocyanatodiphenylurea containing 24.5% of NCO (TDIH) were suspended therein. An elastomer having the mechanical properties specified in Table 7 was produced from this composition by the method described above.

(c) Comparison with an amino polyether not modified according to the present invention.

A comparison elastomer was produced from 100 parts of the unmodified amino polyether, 0.1 parts of 0.1 parts of 3,3'-dimethyl-4,4'-diaminocyclohexylmethane and 16.6 parts of dimeric 2,4-diisocyanatotoluene (TT) by the above-mentioned method.

The viscosities and the contents of free TDA of the modified amino polyethers as well as the mechanical properties of the polyurethane polyurea elastomers produced with the unmodified amino polyether and with the amino polyethers modified according to the invention are given in Table 7:

TABLE 7

| | 25(a) | 25(b) | 25(c) |
|---|---|---|---|
| Aromatic aminopolyether | 100 parts | 100 parts | 100 parts |
| IPDI for modification | 0.97 parts | 1.94 parts | — |
| Viscosity at 22° C. (Pa · s) | 24 | 32 | 10 |
| Content of free TDA (%) | 0.45 | 0.20 | 0.90 |
| 3,3'-dimethyl-4,4'-di-amino-dicyclohexyl-methane (g) | 0.1 | 0.15 | 0.1 |
| TT (characteristic value 1.1) (g) | 15.46 | — | 16.6 |
| TDIH (characteristic value 1.25) (g) | — | 15.15 | — |
| Tensile strength (MPa) (DIN 53 504) | 13 | 14 | 16 |
| Breaking elongation (%) (DIN 53 504) | 500 | 400 | 600 |
| Tear propagation resistance (kN/m) (DIN 53 515) | 36 | 30 | 34 |
| Shore-A-hardness (DIN 53 505) | 93 | 93.5 | 92 |
| Elasticity (%) (DIN 53 512) | 50 | 50 | 49 |

TABLE 7-continued

|  | 25(a) | 25(b) | 25(c) |
|--|--|--|--|

TDIH = CH₃—(NCO-phenyl)—NH—CO—NH—(NCO-phenyl)—CH₃

The amino polyethers modified according to the n with IPDI exhibited a much smaller tendency to discoloration during storage, in particular under the influence of light. The polyurethane ureas produced with the modified amino polyethers of the present invention exhibited a smaller tendency to discoloration in light in comparison with the unmodified amino polyether containing monomeric TDA or the reaction products thereof.

Although the invention has been described in detail in the foregoing for the purpose of illustration, it is to be understood that such detail is solely for that purpose and that variations can be made therein by those skilled in the art without departing from the spirit and scope of the invention except as it may be limited by the claims.

What is claimed is:

1. A process for the production of amino compounds having molecular weight of from 400 to 12,000 which have a reduced content of amino compounds having molecular weights below 400 comprising reacting
   (a) a mixture of
      (1) an amino compound containing terminal aromatic and/or aliphatic amino groups and having a molecular weight of from 400 to 12,000 and
      (2) an amino compound having a molecular weight below 400 with
   (b) an isocyanate in quantities such that from 0.5 to 10 equivalents of isocyanate (b) are present for each equivalent of amino compound (a)(2).

2. The process of claim 1 in which amino compound (a)(2) is an aromatic amino compound.

3. The process of claim 1 in which amino compound (a)(2) is an aromatic diamine.

4. The process of claim 1 in which amino compound (a)(1) is at least difunctional and contains terminal aromatic primary amino groups.

5. The process of claim 1 in which the amino compound (a)(1) is an amino polyether or amino polyester containing terminal aromatic groups and having a molecular weight of from 600 to 6,000.

6. The process of claim 5 in which the amino compound (a)(1) is the product of alkaline hydrolysis of an isocyanate polyether prepolymer or of an isocyanate polyester prepolymer.

7. The process of claim 1 in which isocyanate (b) is selected from aliphatic monoisocyanates, aliphatic diisocyanates, cycloaliphatic monoisocyanates, cycloaliphatic diisocyanates and combinations thereof.

8. The process of claim 7 in which the isocyanate (b) contains isocyanate groups bound to secondary or tertiary carbon atoms.

9. The process of claim 1 in which the isocyanate (b) is used in a quantity such that from 0.8 to 5 equivalents of isocyanate (b) are present for each equivalent of amino compound (a)(2).

10. The process of claim 1 in which the isocyanate (b) is used in a quantity such that from 0.95 to 1.1 equivalents of isocyanate (b) are present for each equivalent of amino compound (a)(2).

11. The process of claim 1 in which the amino compound (a)(2) is 2,4-toluylene diamine.

* * * * *